US011904628B2

(12) United States Patent
Boos et al.

(10) Patent No.: US 11,904,628 B2
(45) Date of Patent: Feb. 20, 2024

(54) PAINT PACKAGE AND PAINT PACKAGE LID

(71) Applicant: Behr Process Corporation, Santa Ana, CA (US)

(72) Inventors: Bruce Boos, Fayetteville, GA (US); Gregory James Warren, Costa Mesa, CA (US)

(73) Assignee: BEHR PROCESS CORPORATION, Santa Ana, CA (US)

( * ) Notice: Subject to any disclaimer, the term of this patent is extended or adjusted under 35 U.S.C. 154(b) by 0 days.

(21) Appl. No.: 18/055,551

(22) Filed: Nov. 15, 2022

(65) Prior Publication Data

US 2023/0072094 A1 Mar. 9, 2023

Related U.S. Application Data

(63) Continuation of application No. 16/497,983, filed as application No. PCT/US2018/031472 on May 8, 2018, now Pat. No. 11,529,825.

(60) Provisional application No. 62/504,661, filed on May 11, 2017.

(51) Int. Cl.
*B44D 3/12* (2006.01)
*B65D 21/02* (2006.01)
*B65D 47/12* (2006.01)

(52) U.S. Cl.
CPC ......... *B44D 3/127* (2013.01); *B65D 21/0219* (2013.01); *B65D 47/122* (2013.01)

(58) Field of Classification Search
CPC .... B44D 3/127; B65D 21/0219; B65D 23/06; B65D 43/06; B65D 43/065; B65D 47/122
See application file for complete search history.

(56) References Cited

U.S. PATENT DOCUMENTS 1,759,274 A 5/1930 O'Brien
1,838,217 A 12/1931 Dival
2,130,637 A 9/1938 Darling
(Continued)

FOREIGN PATENT DOCUMENTS

DE 236102 C 4/1910
GB 2199311 A 7/1988
JP 2004161353 A 6/2004

OTHER PUBLICATIONS

International Search Report and Written Opinion for application No. PCT/US2018/031472 dated Jul. 31, 2018, 10 pages.
(Continued)

*Primary Examiner* — Andrew T Kirsch
(74) *Attorney, Agent, or Firm* — Reising Ethington P.C.

(57) ABSTRACT

A paint package lid (14, 114) includes a base wall (54) having a lid base wall upper surface (56) and a lid base wall lower surface (58), a container coupling rim (60) disposed radially outwardly with respect to the base wall and having a rim upper surface (62), and a closure well (64, 164) disposed radially inwardly with respect to the base wall. The closure well includes a radially outer wall (82) extending downwardly with respect to the base wall, a lower wall (84) extending radially inwardly with respect to the radially outer wall and establishing a lowermost surface (85) of the lid, and a neck (86, 186) disposed radially inwardly with respect to the radially outer wall and extending upwardly from the lower wall and having a closure coupling (95). Also disclosed is a lid and closure assembly and a paint package (10, 110, 210) including the lid.

17 Claims, 7 Drawing Sheets

(56) References Cited

U.S. PATENT DOCUMENTS

| | | | |
|---|---|---|---|
| 2,528,948 | A | 11/1950 | Cosmo |
| 2,801,762 | A | 8/1957 | Atherton |
| 3,237,802 | A | 3/1966 | Wagner |
| 3,289,881 | A | 12/1966 | Ganung |
| 3,523,156 | A | 8/1970 | Phillips, Jr. |
| 3,672,547 | A | 6/1972 | Kozlowski |
| 3,810,279 | A | 5/1974 | Swick et al. |
| 4,288,000 | A | 9/1981 | Luker et al. |
| 4,356,930 | A | 11/1982 | Roper |
| 4,378,895 | A | 4/1983 | Woinarski |
| 4,512,494 | A | 4/1985 | Von Holdt |
| 5,307,949 | A | 5/1994 | Von Holdt, Jr. |
| 5,328,047 | A | 7/1994 | Smith |
| 5,390,808 | A | 2/1995 | Choma et al. |
| 5,660,302 | A | 8/1997 | Trout |
| 6,106,261 | A | 8/2000 | von Holdt |
| 6,418,608 | B2 | 7/2002 | Keesler |
| 6,530,500 | B2 | 3/2003 | Bravo et al. |
| 6,634,525 | B2 | 10/2003 | Bravo et al. |
| 6,675,983 | B1 | 1/2004 | Alvares et al. |
| 6,722,519 | B2 | 4/2004 | Baughman |
| 6,761,287 | B2 | 7/2004 | Caruso |
| 6,793,088 | B2 | 9/2004 | Baughman |
| 6,805,255 | B2 | 10/2004 | Alvares et al. |
| 6,896,156 | B2 | 5/2005 | McDonald et al. |
| 6,979,163 | B2 | 12/2005 | Brletich et al. |
| 7,168,585 | B2 | 1/2007 | Baughman |
| 7,198,315 | B2 | 4/2007 | Cass et al. |
| 7,325,687 | B2 | 2/2008 | Bravo et al. |
| 7,329,041 | B2 | 2/2008 | Nottingham et al. |
| D564,879 | S | 3/2008 | Baughman |
| D567,087 | S | 4/2008 | Baughman et al. |
| 7,434,706 | B2 | 10/2008 | Nottingham et al. |
| D583,235 | S | 12/2008 | Baughman |
| 7,464,830 | B2 | 12/2008 | Baughman |
| 7,513,387 | B2 | 4/2009 | Baughman |
| 7,520,403 | B2 | 4/2009 | Baughman |
| D602,778 | S | 10/2009 | Stalions |
| 7,607,551 | B2 | 10/2009 | Coughlin et al. |
| D608,641 | S | 1/2010 | Baughman et al. |
| D610,007 | S | 2/2010 | Baughman et al. |
| D610,008 | S | 2/2010 | Baughman |
| D610,457 | S | 2/2010 | Baughman |
| 7,690,526 | B1 | 4/2010 | Hoff |
| 7,703,641 | B2 | 4/2010 | Bravo et al. |
| D641,628 | S | 7/2011 | Baughman |
| 7,997,440 | B2 | 8/2011 | Baughman |
| D655,605 | S | 3/2012 | Baughman |
| 8,171,961 | B2 | 5/2012 | Koyama |
| 8,695,840 | B2 | 4/2014 | Baughman |
| 8,695,846 | B2 | 4/2014 | Letica et al. |
| 2003/0168465 | A1 | 9/2003 | Breimon |
| 2004/0019525 | A1 | 1/2004 | Kish |
| 2004/0175251 | A1 | 9/2004 | Paul |
| 2006/0043095 | A1 | 3/2006 | Maholm et al. |
| 2006/0054625 | A1 | 3/2006 | Schwarz |
| 2006/0261067 | A1 | 11/2006 | Letica |
| 2008/0128457 | A1 | 6/2008 | Bravo et al. |
| 2011/0036804 | A1 | 2/2011 | Letica et al. |
| 2011/0036843 | A1 | 2/2011 | Letica et al. |
| 2013/0341342 | A1 | 12/2013 | Campbell et al. |
| 2016/0009456 | A1 | 1/2016 | Van De Klippe et al. |
| 2016/0075484 | A1 | 3/2016 | Baughman |

OTHER PUBLICATIONS

Chinese Office Action corresponding to Chinese Application No. 201880031209.0 dated May 21, 2021, pp. 1-9.

Chilean Office Action corresponding to Chile Application No. 201903226 dated Feb. 28, 2022, 11 pages.

Partial European Search Report corresponding to European application 23165138, dated Jun. 9, 2023, 17 pages.

Korean Office Action corresponding to Korean application 10-20197036548, dated Mar. 23, 2023, 26 pages.

Mexican Office Action corresponding to Mexican application MX/a/2019/013433, dated May 11, 2023, 7 pages.

European Search Report corresponding to European application 23165138, dated Aug. 18, 2023, 6 pages.

PAINT PACKAGE AND PAINT PACKAGE LID

TECHNICAL FIELD

This disclosure relates generally to containers and, more particularly, to packages for packaging liquid, for example, paint packages and paint package components.

BACKGROUND

Many prior art paint packages, particularly one-gallon paint packages, include a metal container and a metal lid friction fit to the metal container. Some metal lids include a punched tint hole fitted with a plastic cup-shaped tint plug. At a point of sale, the plug is removed, tint is added, and the hole is replugged. But prior art plug designs may be too complex and cost-prohibitive, or may be prone to leaking when a package is jostled when carried or even inverted when shipped and particularly when the package contains stain or low viscosity paint.

DETAILED DESCRIPTION

In general, a novel package is disclosed that includes a container, a novel lid for the container, and a closure for the lid. While the apparatus described herein includes an illustrative embodiment of a paint package including a paint can and a corresponding paint lid and closure, it will be appreciated as the description proceeds that the apparatus may be useful in many different applications and may be implemented in many other embodiments. Also, as used herein, it will be understood that the term "paint" refers not only to paint applications, but also to other applications. Accordingly, as used herein, the term "paint" broadly includes paints, stains, varnishes, strippers, sealers, dyes, waterproofers, and other like impotable liquid products.

Figure 1:
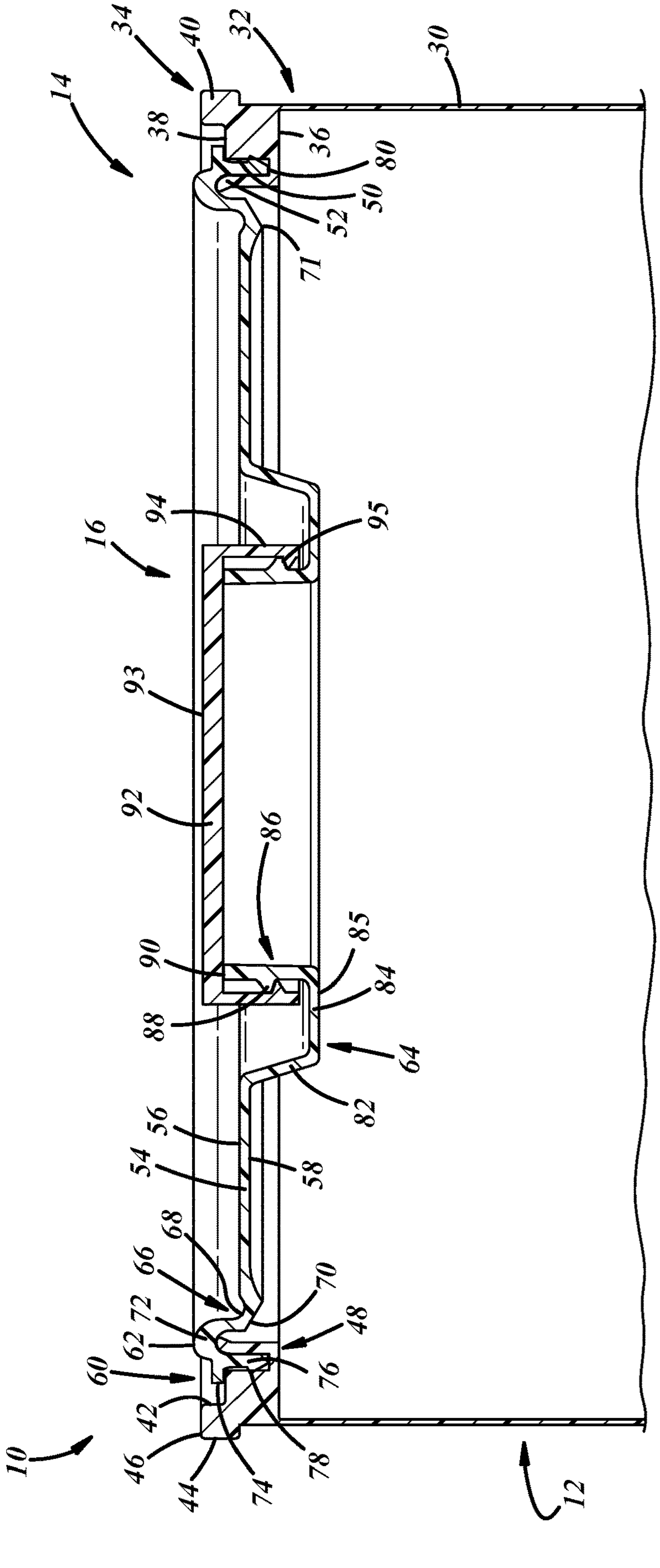
FIG. 1 is a fragmentary cross-sectional view of a paint package according to an illustrative embodiment.

With specific reference to the drawing figures, FIG. 1 illustrates a novel package 10 that includes a container 12, a novel lid 14 coupled to the container 12, and a closure 16 coupled to the lid 14. As disclosed, and as may be claimed herein, the package 10 may be in an assembled state or a disassembled/unassembled state such that the lid 14 is configured to be coupled to the container 12 and features of the lid 14 are configured to be coupled to corresponding features of the container 12 and, likewise, the closure 16 is configured to be coupled to the lid 14. Also, as used herein, the terms upper, lower, upward, downward, and other like terms are used for context of how a package is configured to be used, merely as an aid for understanding the relationships between components and features.

The container 12 may include, for example, a one-gallon paint can, a five-gallon paint pail, or the like. The container 12 may be constructed from metal, plastic, or any other suitable material, and may include two or more components roll-formed, molded, adhered, or coupled together in any suitable manner.

In any case, and with reference to FIG. 5, the container 12 may include a closed end 18 with a base 20 including a container base wall 22, a container base rim 24 disposed radially outwardly of the container base wall 22 and having a wall thickness greater than that of the container base wall 22 and having a base wall lower surface 26, and a nesting skirt 28 disposed between the container base wall 22 and the container base rim 24 and depending downwardly below the base wall lower surface 26.

With reference to FIG. 1, the container 12 also may include a sidewall 30 extending upwardly from the container base rim 24 (FIG. 5) and having an upper end 32 with a mounting rim 34 at the upper end 32 of the sidewall 30. The mounting rim 34 may include a lower rim surface 36 extending radially inwardly with respect to the container sidewall 30, and a rim base surface 38 axially spaced above the lower rim surface 36. The mounting rim 34 also may include a nesting bead 40 disposed radially outwardly of the rim base surface 38 and having a radially inner bead surface 42, a radially outer bead surface 44, and a bead upper surface 46 disposed between the radially inner and outer bead surfaces 42, 44 and axially spaced above the rim base surface 38 of the container 12. The mounting rim 34 further may include a lid coupling 48 disposed radially inwardly of the upper base surface 38 and including a radially outward wall 50, a radially inward wall 52, and an annular channel therebetween for coupling to a portion of the lid 14 as described further herein below. In one embodiment, the container base 18 (FIG. 5) may be a component separately produced from the container sidewall 30 and mounting rim 34 and then coupled to the sidewall 30. In another embodiment, the container mounting rim 34 may be a component separately produced from the container sidewall 30 and base 18 and then coupled to the sidewall 30.

The lid 14 may be constructed from metals, composites, plastics, or any other material(s) suitable for use in packaging paint. In the illustrated example, the lid 14 may be constructed from polypropylene, or any other suitable plastic, and may include a single unitary component that may be injection molded, compression molded, or the like. In any case, the lid 14 includes a base wall 54 having a lid base wall upper surface 56 and a lid base wall lower surface 58. Also, the lid 14 includes a container coupling rim 60 disposed radially outwardly with respect to the base wall 54 and having a rim upper surface 62. Further, the lid 14 includes a closure well 64 disposed radially inwardly with respect to the base wall 54.

The lid 14 also may include a coupling wall 66 disposed radially between and coupling together the base wall 54 and the container coupling rim 60. The coupling wall 66 may include an upper surface 68 that may be incurvate, and a lower surface 70 that may be straight and extending radially outwardly and axially upwardly. The configuration of the coupling wall 66 may provide suitable flexure between the rim 60 and the base wall 54.

Figure 2:
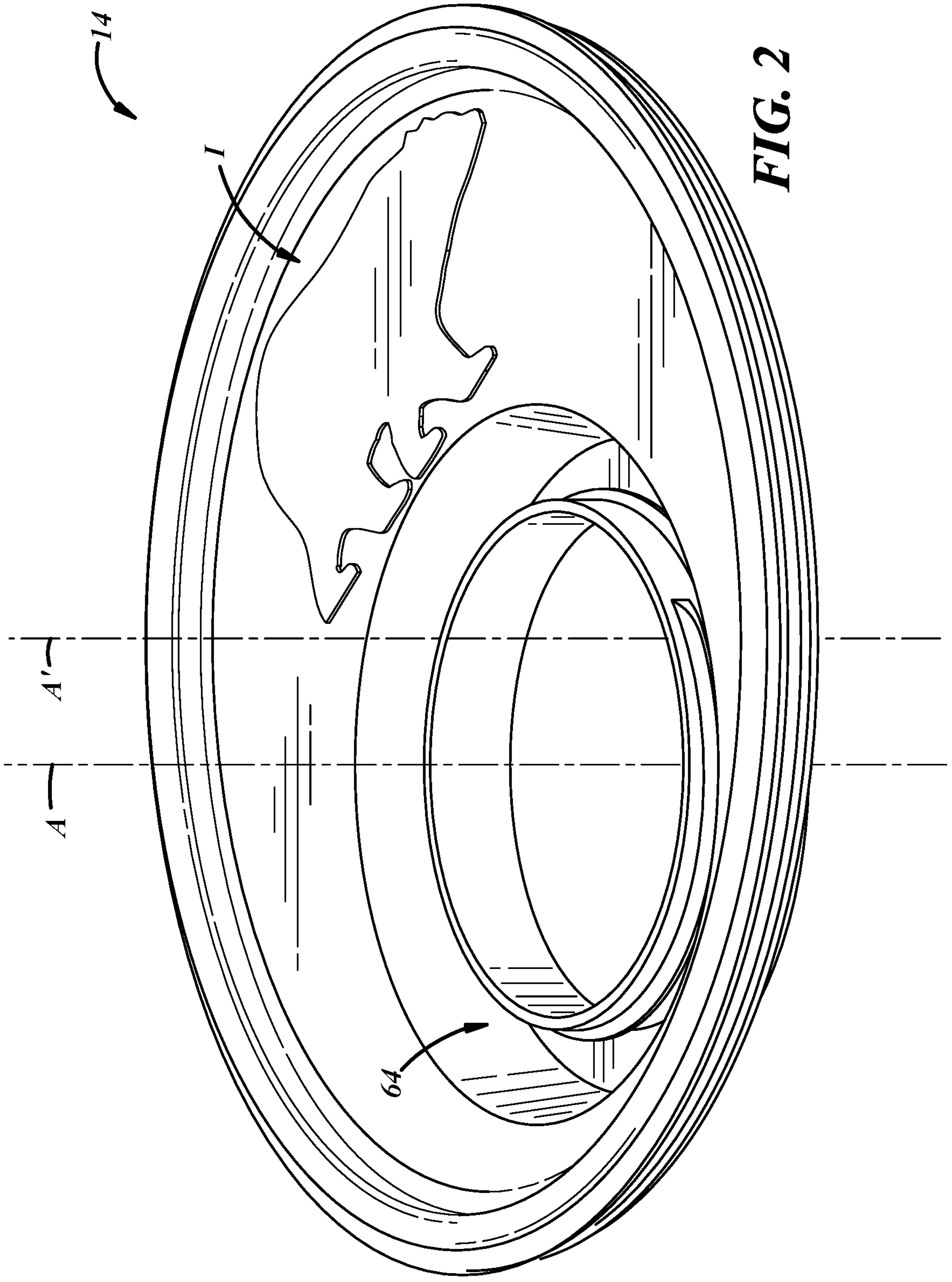
FIG. 2 is a perspective view of an illustrative embodiment of a lid for the package shown in FIG. 1.
Figure 3:
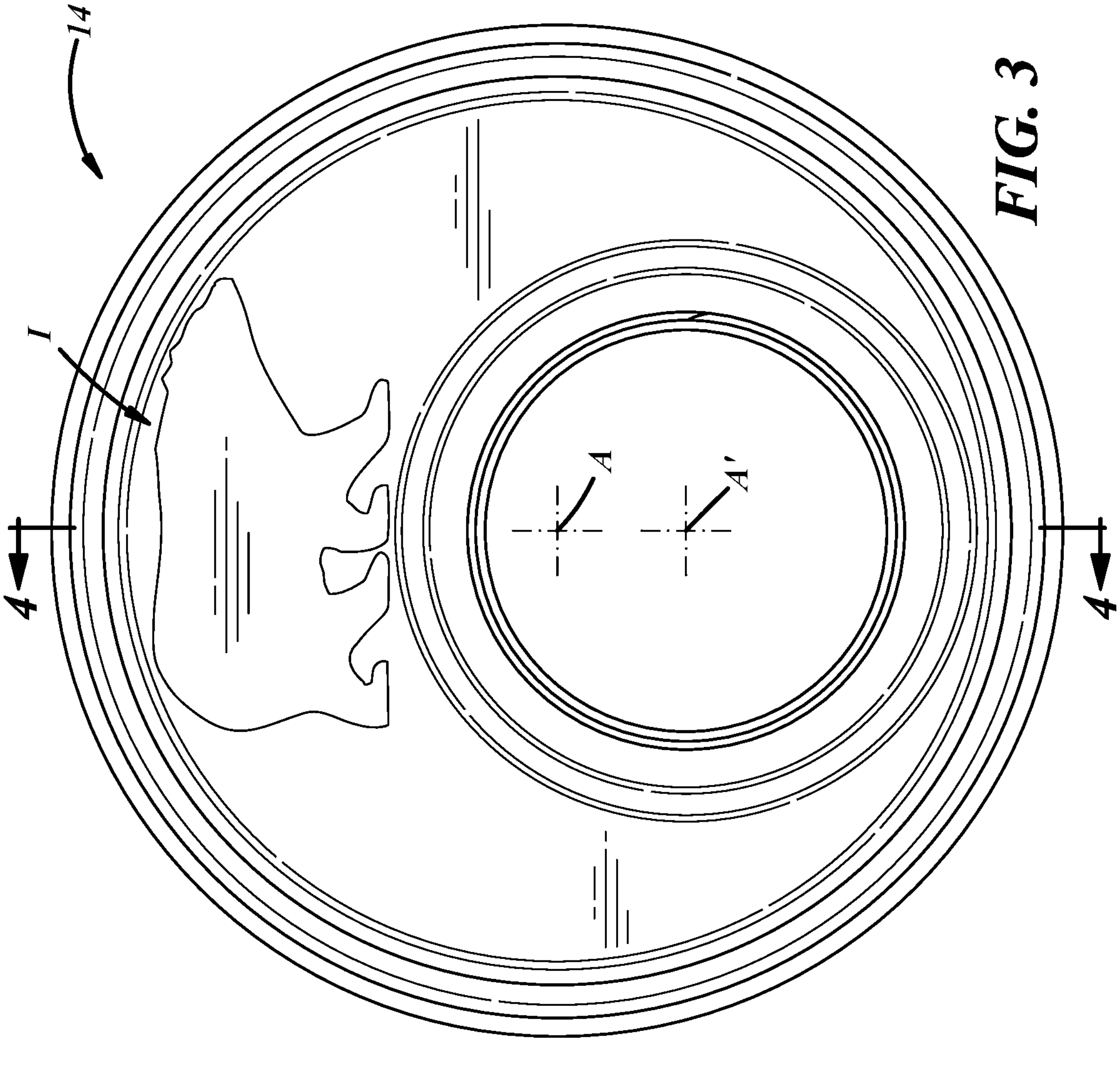
FIG. 3 is a top view of the lid of FIG. 2.

The base wall 54 may be substantially planar and may carry graphics, logos, or other indicia I, which may be molded thereto (as shown in FIGS. 2 and 3). The base wall

54 may have a thickness that is greater than that of the container sidewall 30, and the base wall 54 may surround the closure well 64.

The container coupling rim 60 may include a bight 72, a pry flange 74 that may extend radially outwardly with respect to the bight 72, and a container coupling skirt 76 that may extend axially downwardly with respect to the bight 72. The bight 72 may establish the rim upper surface 62. The container coupling skirt 76 may be accepted in the annular channel of the container 12 for coupling of the lid 14 to the container 12, for example, via friction fit. In this regard, the skirt 76 may be provided with one or more barbs, beads, or other projections 78 to facilitate suitable friction fitting and sealing. Also, the container coupling skirt 76 may include a skirt lower surface that may be disposed axially below a coupling wall lower surface 71.

Figure 4:
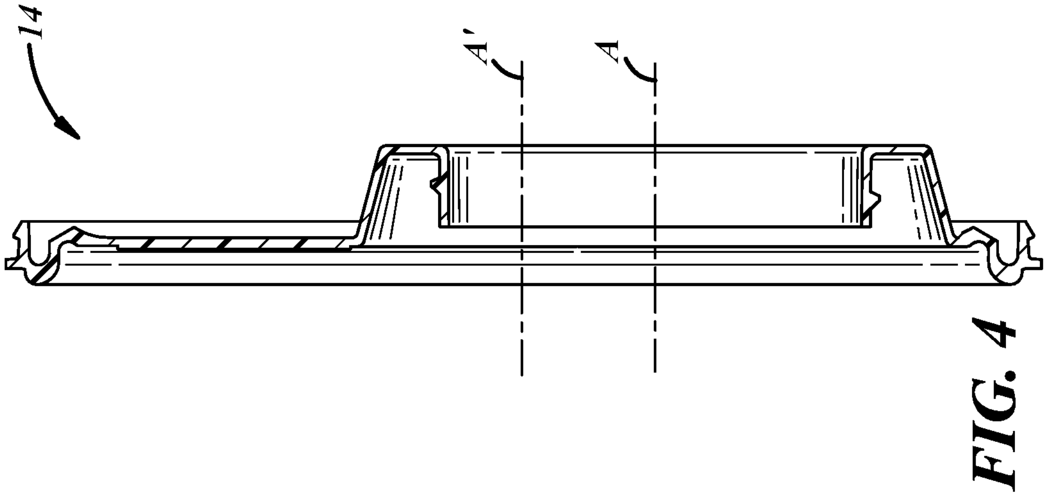
FIG. 4 is a cross-sectional view of the lid of FIG. 2.

The closure well 64 may include a radially outer wall 82 extending radially inwardly and axially downwardly at a non-perpendicular angle with respect to the base wall 54, a lower wall 84 extending radially inwardly with respect to the radially outer wall 82 and establishing a lowermost surface 85 of the lid 14, and a neck 86 disposed radially inwardly with respect to the radially outer wall 82 and extending upwardly from the lower wall 84 and having a closure coupling 88. With reference to FIG. 4, the radially outer wall 82 of the closure well 64 may extend at an angle from vertical of about 15 degrees, for example, between 10 and 20 degrees including all ranges, subranges, and values therebetween, and, more specifically, the angle may be between 12 and 18 degrees. In other embodiments, the angle may be between 0.5 and 44.5 degrees including all ranges, subranges, and values therebetween. Also, a ratio of a closure well outer diameter to a lid outer diameter may be about 70%, for example, between 51% and 89%, including all ranges, subranges, and values therebetween, and, more specifically, the ratio may be between 55% and 85%. In other embodiments, the ratio may be between 30% and 90% including all ranges, subranges, and values therebetween. The lowermost surface 85 of the closure well 64 may be axially spaced below (or axially recessed with respect to) the skirt lower surface 80, and may be axially spaced below (or axially recessed with respect to) the lower rim surface 36 of the container rim 34. The neck 86 terminates in a neck upper surface 90 that may be axially recessed with respect to the rim upper surface 62, and may be axially proud with respect to the base wall upper surface 56. The closure coupling 88 may include one or more threads of helical or any other configuration, one or more bayonet features, or any other suitable closure coupling features. A longitudinal central axis A of the closure well 64 may be radially offset from a longitudinal central axis A' of the lid 14 as a whole.

The closure 16 may be constructed from plastic, for example, polypropylene, or any other suitable plastic, and may include a single unitary component that may be injection molded, compression molded, or the like. In any case, the closure 16 may include a closure base wall 92 having a closure base wall upper surface 93, and a closure skirt 94 depending axially downwardly from the closure base wall 92 and having a lid coupling 95. The closure base wall 92 may include one or more sealing lips or other features (not shown), and/or may carry a sealing liner or any other suitable component or layer (not shown) to seal with the lid 14. The closure base wall upper surface 93 may be axially recessed with respect to the rim upper surface 62 of the container coupling rim 60.

Figure 5:
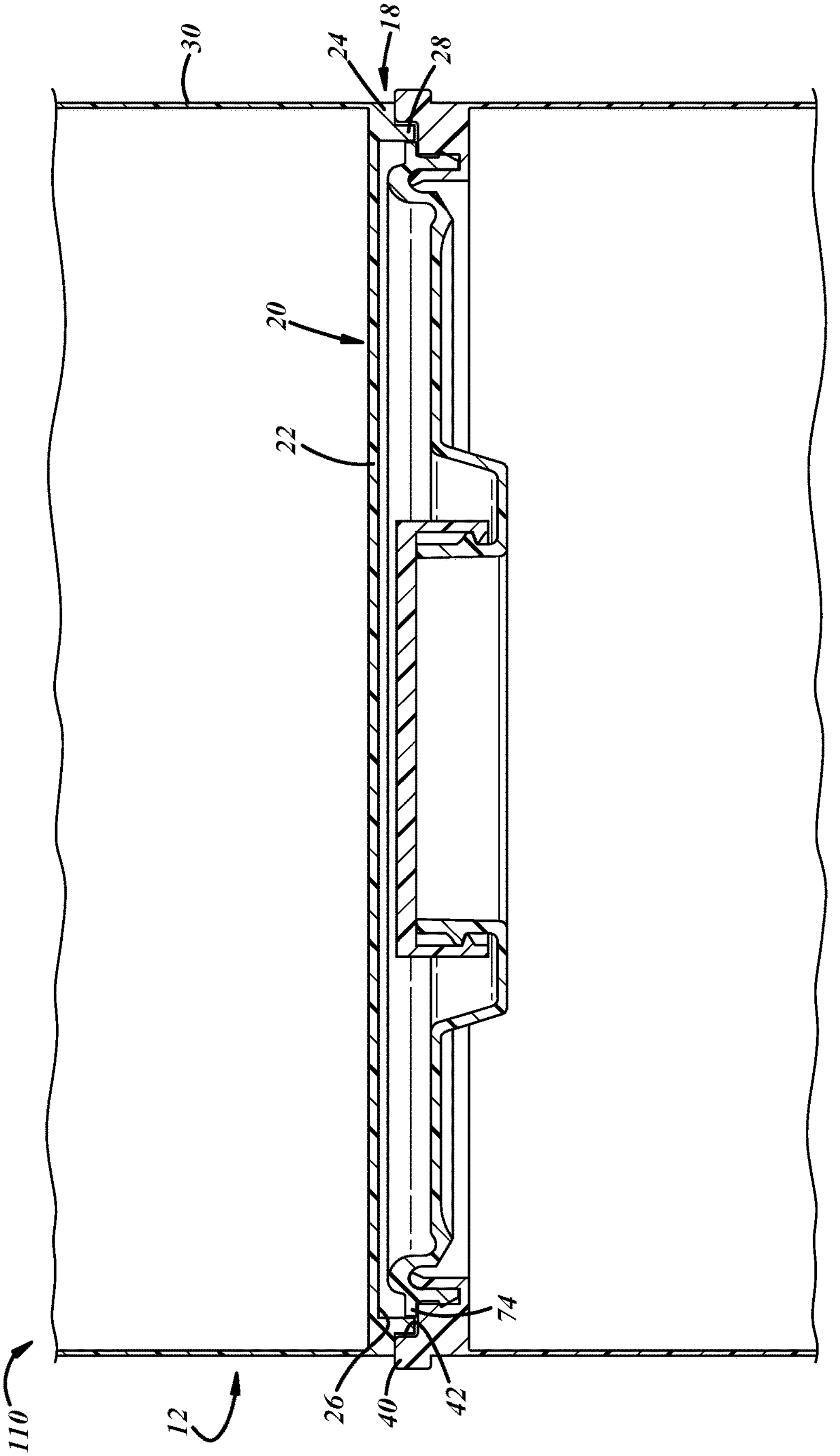
FIG. 5 is a cross-sectional view of the package of FIG. 1, further illustrating another package stacked on top of the package.
Figure 6:
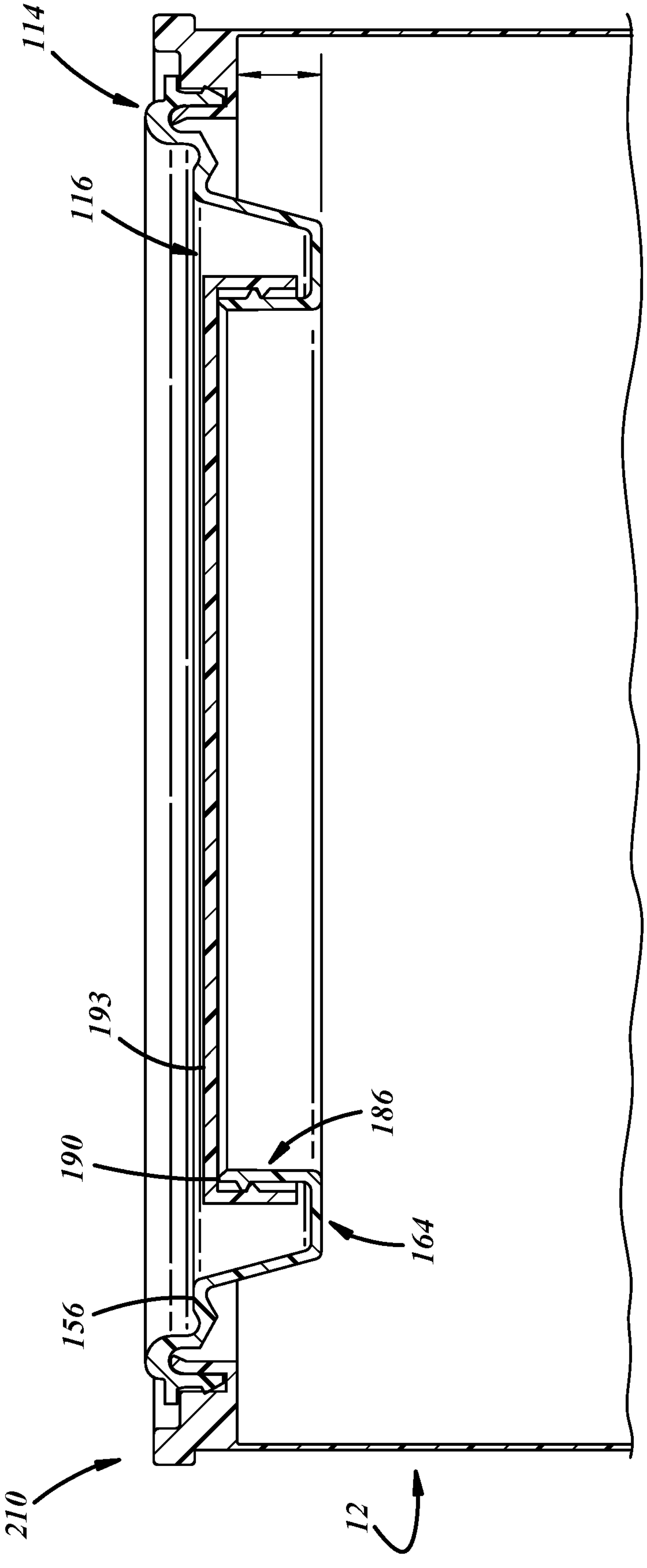
FIG. 6 is a fragmentary cross-sectional view of a paint package according to another illustrative embodiment.
Figure 7:
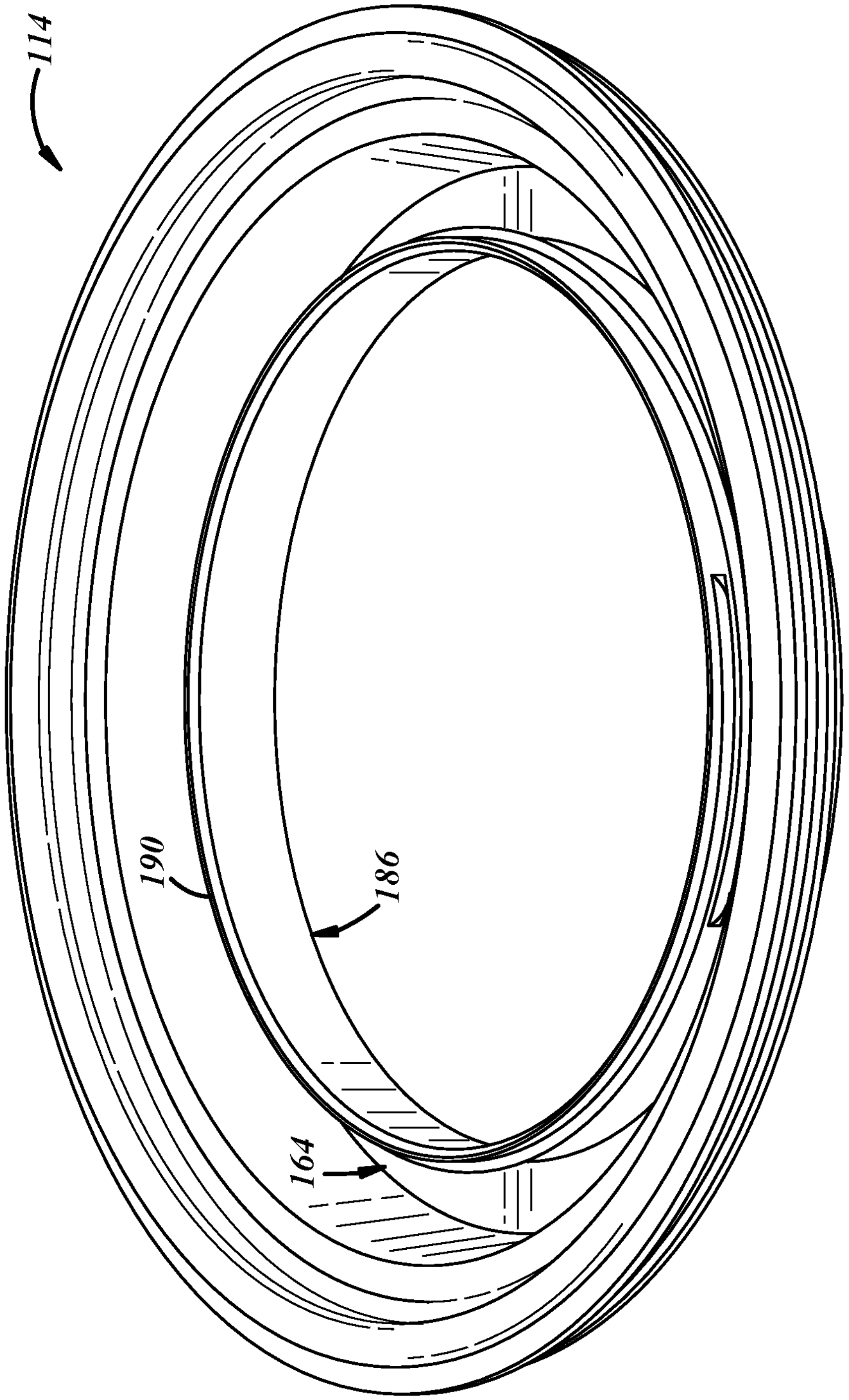
FIG. 7 is a perspective view of an illustrative embodiment of a lid for the package shown in FIG. 6.
Figure 9:
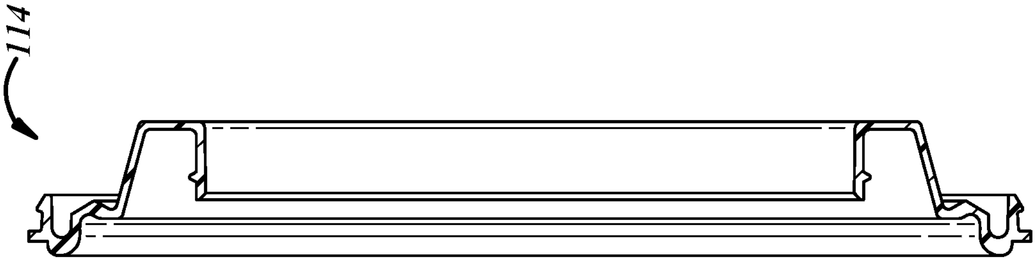
FIG. 9 is a cross-sectional view of the lid of FIG. 7.
Figure 8:
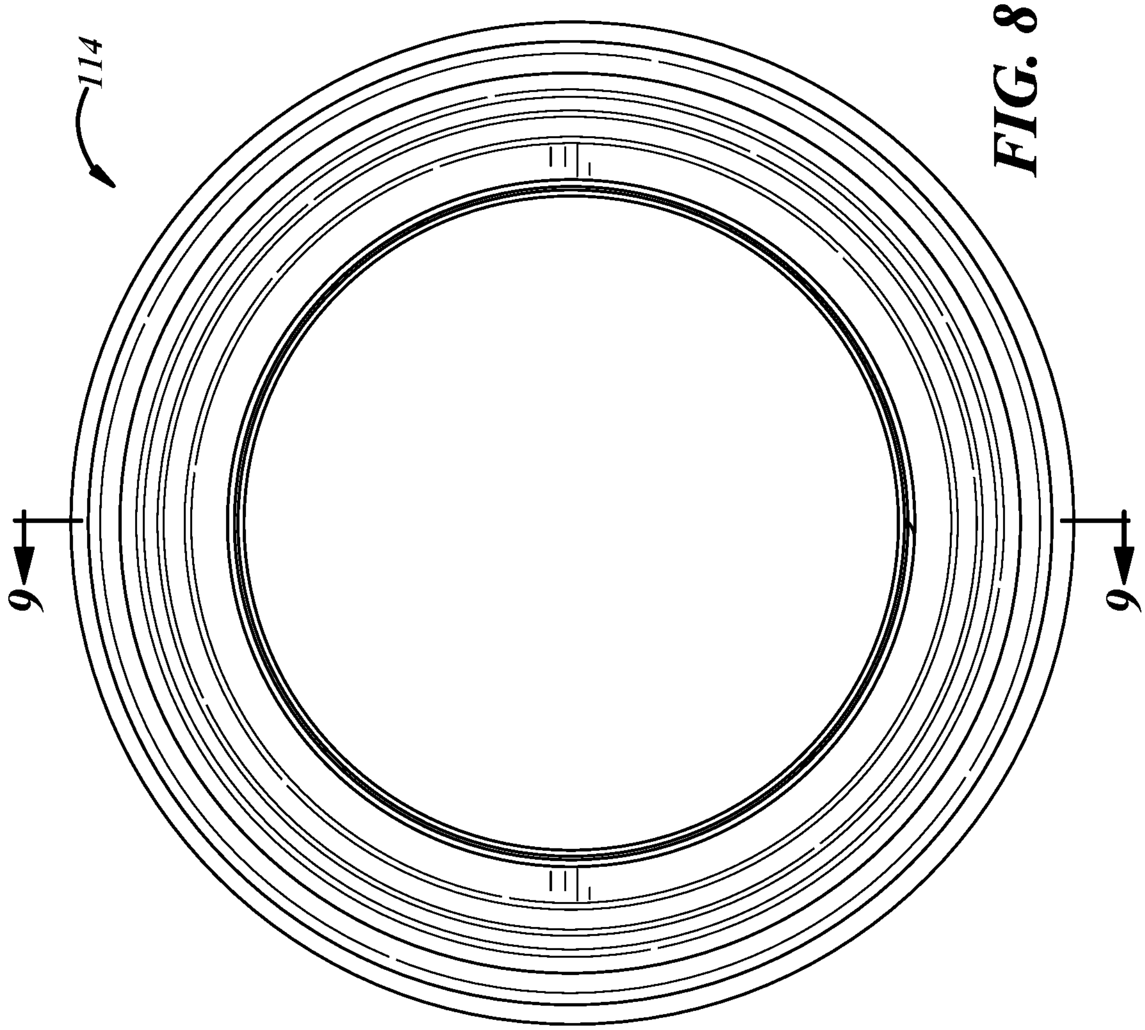
FIG. 8 is a top view of the lid of FIG. 7.

With reference to FIG. 5, a second, upper package 110 is stacked on a first, lower package 10. With reference to the lower package 10, a nesting gap may be established between the pry flange 74 of the lid 14 and the radially inner bead surface 42 of the nesting bead 40. The nesting skirt 28 of the upper package 110 may be located in the nesting gap of the lower package 10 to locate the packages 10, 110 with respect to one another.

FIGS. 6-9 illustrate another illustrative embodiment of a novel package 210 including the container 12, a novel lid 114 for the container 12, and a closure 116 for the lid 114. This embodiment is substantially similar to the embodiment of FIGS. 1-5. Accordingly, the descriptions of the embodiments are hereby incorporated into one another, and description of subject matter common to the embodiments generally may not be repeated.

Here, in contrast to the illustrated lid of the previous embodiment, the ratio of the closure well diameter to the lid diameter is significantly larger. Also, a neck 186 of a closure well 164 terminates at an upper surface 190 that is axially recessed with respect to a lid base wall upper surface 156. Likewise, a closure base wall upper surface 193 of the closure 116 is axially recessed with respect to the lid base wall upper surface 156.

Thus, there has been described a novel packaging component and related novel assembly, and the features of various implementing embodiments may be combined to form further embodiments.

A portion of the disclosure of this patent document contains material which may be subject to copyright, trademark, and/or trade dress protection. The owner of such copyright, trademark, and/or trade dress protection has no objection to the facsimile reproduction by anyone of the patent disclosure as it appears in the Patent and Trademark Office patent files or records, but otherwise reserves all copyright, trademark, and/or trade dress rights whatsoever.

As used in this patent application, the terminology "for example," "for instance," "like," "such as," "comprising," "having," "including," and the like, when used with a listing of one or more elements, is open-ended, meaning that the listing does not exclude additional elements. Likewise, when preceding an element, the articles "a," "an," "the," and "said" mean that there are one or more of the elements. Moreover, directional words such as front, rear, top, bottom, upper, lower, radial, circumferential, axial, lateral, longitudinal, vertical, horizontal, transverse, and/or the like are employed by way of example and not limitation. Other terms are to be interpreted and construed in the broadest reasonable manner in accordance with their ordinary and customary meaning in the art, unless the terms are used in a context that requires a different interpretation.

Finally, the present disclosure is not a definitive presentation of an invention claimed in this patent application, but is merely a presentation of examples of illustrative embodiments of the claimed invention. More specifically, the present disclosure sets forth one or more examples that are not limitations on the scope of the claimed invention or on terminology used in the accompanying claims, except where terminology is expressly defined herein. And although the present disclosure sets forth a limited number of examples, many other examples may exist now or are yet to be discovered and, thus, it is neither intended nor possible to disclose all possible manifestations of the claimed invention. In fact, various equivalents will become apparent to artisans of ordinary skill in view of the present disclosure and will fall within the spirit and broad scope of the accompanying claims. Therefore, the claimed invention is not limited to the particular examples of illustrative embodiments disclosed herein but, instead, is defined by the accompanying claims.

The invention claimed is:

1. A paint package, comprising:

a paint package lid and closure assembly, including a paint package lid, including a base wall having a lid base wall upper surface and a lid base wall lower surface:

a container coupling rim disposed radially outwardly with respect to the base wall and having a rim upper surface;

a coupling wall disposed radially between and coupling together the base wall and the rim upper surface, and extending radially outwardly and axially upwardly; and a closure well disposed radially inwardly with respect to the base wall and including:

a radially outer wall extending downwardly with respect to the base wall:

a lower wall extending radially inwardly with respect to the radially outer wall and establishing a lowermost surface of the lid; and a neck disposed radially inwardly with respect to the radially outer wall and extending upwardly from the lower wall and having a closure coupling a closure coupled to the lid, and including:

a closure base wall having a closure base wall upper surface; and a closure skirt depending axially downwardly from the closure base wall and having a lid coupling; and a container including a sidewall having an upper end and a mounting rim at the upper end of the sidewall, wherein the mounting rim includes:

a lower rim surface extending radially inwardly with respect to the container sidewall;

a rim base surface;

a nesting bead disposed radially outwardly of the rim base surface and having a radially inner bead surface, a radially outer bead surface, and a bead upper surface disposed between the radially inner and outer bead surfaces and axially spaced above the rim base surface of the container; and a lid coupling disposed radially inwardly of the rim base surface and including a radially outward wall, a radially inward wall, and an annular channel therebetween to accept the container coupling skirt of the container coupling rim of the lid.

2. The paint package of claim 1, wherein the coupling wall includes an incurvate upper surface and a straight lower surface.

3. The paint package of claim 2, wherein the lid base wall upper surface extends radially inwardly from the coupling wall incurvate upper surface and in a manner where the lid base wall upper surface is parallel to a neck upper surface.

4. The paint package of claim 1, wherein the lid base wall is parallel to the lower wall of the closure well.

5. The paint package of claim 1, wherein the lid base wall upper surface and lower surface are parallel such that the lid base wall is planar and extends radially inwardly from the container coupling rim to the closure well.

6. The paint package of claim 1, wherein the container coupling rim is integrally formed to the base wall via the coupling wall to form a single unitary component.

7. The paint package of claim 1, wherein the radially outer wall of the closure well extends radially inwardly and axially downwardly at a non-perpendicular angle with respect to the base wall.

8. The paint package of claim 1, wherein the neck of the closure well terminates at a neck upper surface that is axially proud with respect to the base wall upper surface.

9. The paint package of claim 1, wherein the neck of the closure well terminates at an upper surface that is axially recessed with respect to the base wall upper surface.

10. The paint package of claim 1, wherein the lid has an outer diameter, and the closure well has an outer diameter, wherein a ratio of the closure well outer diameter to the lid outer diameter is between 51% and 89%.

11. The paint package of claim 1, wherein the closure base wall upper surface of the closure is axially recessed with respect to the rim upper surface of the container coupling rim.

12. The paint package of claim 1, wherein the closure base wall upper surface of the closure is axially recessed with respect to the lid base wall upper surface of the lid base wall.

13. The package of claim 1, wherein a nesting gap is established between the coupling rim of the lid and the radially inner bead surface of the nesting bead.

14. A plurality of paint packaging assemblies, comprising:

the package of claim 13; and a second container stacked on the container and including a container base having a nesting skirt located in the nesting gap of the package of claim 13.

15. A paint package, comprising:

a paint package lid, comprising:

a base wall having a lid base wall upper surface and a lid base wall lower surface;

a container coupling rim disposed radially outwardly with respect to the base wall and having a rim upper surface; and a closure well disposed radially inwardly with respect to the base wall and including:

a radially outer wall extending downwardly with respect to the base wall;

a lower wall extending radially inwardly with respect to the radially outer wall and establishing a lowermost surface of the lid; and a neck disposed radially inwardly with respect to the radially outer wall and extending upwardly from the lower wall and having a closure coupling; and a container including a sidewall having an upper end and a mounting rim at the upper end of the sidewall, wherein the mounting rim includes:

a lower rim surface extending radially inwardly with respect to the container sidewall;

a rim base surface;

a nesting bead disposed radially outwardly of the rim base surface and having a radially inner bead surface, a radially outer bead surface, and a bead upper surface disposed between the radially inner and outer bead surfaces and axially spaced above the rim base surface of the container; and a lid coupling disposed radially inwardly of the upper base surface and including a radially outward wall, a radially inward wall, and an annular channel therebetween to accept the container coupling skirt of the container coupling rim of the lid.

16. The package of claim 15, wherein a nesting gap is established between the pry flange of the lid and the radially inner bead surface of the nesting bead.

17. A plurality of paint packaging assemblies, comprising:

the package of claim 16; and a second container stacked on the container and including a container base having a nesting skirt located in the nesting gap of the package of claim 16.

* * * * *